(12) United States Patent
Kotick et al.

(10) Patent No.: US 6,559,867 B1
(45) Date of Patent: May 6, 2003

(54) CONFIGURATION SYSTEM FOR NETWORKED TRAINING MODULES AND ASSOCIATED METHODS (75) Inventors: David M. Kotick, Orlando, FL (US); Eric E. Anschuetz, II, Oviedo, FL (US); Jonathan D. Engle, Orlando, FL (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 09/450,642

(22) Filed: Nov. 24, 1999

(51) Int. Cl.[7] .......................... G06F 3/00; G06F 13/00; G06F 15/16; G09B 3/00
(52) U.S. Cl. ..................... 345/771; 345/734; 345/736; 345/740; 345/748; 345/750; 345/769; 434/350
(58) Field of Search ............................. 345/716, 733, 345/734, 736, 740, 748, 749, 750, 764, 771, 773, 839, 969, 769; 434/2, 6, 10–11, 14, 25, 27, 350

(56) References Cited

U.S. PATENT DOCUMENTS

| | | | | |
|---|---|---|---|---|
| 4,959,015 A | * | 9/1990 | Rasinki et al. .................. 434/2 |
| 5,308,022 A | * | 5/1994 | Cronkhite et al. ........ 434/14 X |
| 5,310,349 A | * | 5/1994 | Daniels et al. .............. 434/350 |
| 5,394,522 A | * | 2/1995 | Sanchez-Frank et al. ....................... 345/839 X |
| 5,474,454 A | * | 12/1995 | Knapp et al. ............. 434/25 X |
| 5,787,333 A | * | 7/1998 | Rasinski et al. .......... 434/14 X |
| 5,885,086 A | * | 3/1999 | Gerber et al. ................ 434/2 X |
| 5,957,699 A | * | 9/1999 | Peterson et al. ............ 434/350 |
| 5,958,012 A | * | 9/1999 | Battat et al. ............ 345/969 X |
| 6,078,322 A | * | 6/2000 | Simonoff et al. ....... 345/733 X |
| 6,151,023 A | * | 11/2000 | Chari ..................... 345/839 X |

* cited by examiner

Primary Examiner—Cao H. Nguyen
Assistant Examiner—X L Bautista
(74) Attorney, Agent, or Firm—Robert W. Adams; John D. Lewis; Mark O. Glut (57) ABSTRACT

A training system includes software installable on an instructor's computer for configuring a plurality of workstations networked thereto. The software is adapted to copy and install an indicated training module including a particular instruction functionality onto a selected student workstation. Once all the workstations are configured as desired, the instructor can invoke additional components of the system, including initiating a running of a training scenario from the instructor's computer on selected workstations. The training scenario includes input provided to the training module, to which a trainee responds, and the instructor can assess the response. A particular embodiment of the invention is for use in an environment wherein coordinated effort by a plurality of workers is required. Such environments may include, but are not intended to be limited to, a command center of a military location.

1 Claim, 12 Drawing Sheets

CONFIGURATION SYSTEM FOR NETWORKED TRAINING MODULES AND ASSOCIATED METHODS

BACKGROUND OF THE INVENTION

1. Field of the Invention

The present invention relates to automated training systems and, more particularly, to systems for remotely configuring a plurality of workstations within a training system network.

2. Description of Related Art

The field of automated learning has penetrated many spheres of education. Computer-based training offers many advantages, including flexibility in scheduling "class" time, the capability of remote learning locations, and the possibility of interactive, individually paced learning. The progress of each trainee/student is also readily evaluatable and documentable via software tools and/or via instructor assessment. Further, an instructor can monitor many students simultaneously and at any desired time.

A particular system for automated learning via equipment simulation is to be found in the military. In such systems a plurality of computers are networked to an instructor's computer. Each of the computers typically has resident thereon at least one simulation module representative of a functional unit that is designed to train a student in the operation of a particular piece of equipment or system.

An exemplary system used for naval training comprises a plurality of computers arrayed in a configuration designed to represent a combat information center (CIC) of a particular vessel. Each of the computers has resident in memory at least one simulation tool representative of that which is actually found on the simulated vessel. Typically physical rooms are configured to contain a number of workstations, each loaded with a simulation tool. The workstations are further physically arrayed to mimic an actual vessel's CIC.

In use an exercise is initiated to train a collection of students positioned as they would be on the vessel being simulated. A particular exercise might comprise, for example, an instructor initiating a training scenario, such as an approach of a hostile aircraft. The appropriate signals are generated by the simulation modules at each computer, and the trainees are expected to analyze their respective incoming signals and determine their cause and origin.

Up to the present the training computers known in the art have had to be configured locally and sequentially with the desired software modules. Thus altering an individual computer's configuration also had to be performed locally, reducing the flexibility of the system.

SUMMARY OF THE INVENTION

It is therefore an object of the present invention to provide an easily configurable automated training system.

It is an additional object to provide such a training system that can support multiple users at a plurality of stations.

It is a further object to provide such a system that can configure a cluster of stations to simulate a physical layout of a cluster of apparatus to form a virtual room.

It is another object to provide such a system that can incorporate real equipment with computer workstations.

It is yet an additional object to provide such a system that can simulate the configuration of a naval vessel for training sensor equipment operators.

It is yet a further object to provide a method for configuring an automated training system remotely.

It is yet another object to provide a method of training a plurality of students to analyze incoming signals on a plurality of coordinated simulation workstations.

These objects and others are attained by the present invention. One aspect of the invention is a software system installable on an instructor's computer for configuring a plurality of workstations. This system is a graphically oriented dynamic configuration utility that permits the instructor to "drag" an icon representing a selected workstation to a virtual room on a computer screen and also to "drag" an icon representing a simulation training module onto each workstation within the virtual room.

The system comprises means for receiving a configuration directive to install an indicated training module onto the storage means of a selected student workstation. Means are provided for accessing storage means on the instructor computer to retrieve the indicated training module and for copying the training module. Means are further provided for installing the copy onto the selected workstation's storage means.

Once the workstations are configured as desired, the instructor can invoke additional components of the system, including means for initiating a running of a training scenario from the instructor's computer on the selected workstation. The training scenario includes input provided to the training module. The system also comprises means for receiving a trainee's response that the trainee inputs into the workstation. The instructor can then assess the response.

A particular embodiment of the invention is for use in an environment wherein coordinated effort by a plurality of workers is required. Such environments may include, but are not intended to be limited to, a command center of a military location (e.g., a CIC on a naval vessel), a nuclear power plant, and an automated manufacturing facility. For such environments the training scenario is run on multiple workstations, each of which represents a station within that environment.

Another aspect of the invention comprises a training system that embodies the configuration software system as described above and an instructor computer with the software installed thereon and having a processor and display means, storage means, and input means in electronic communication with the processor.

A plurality of training modules are resident on the instructor computer's storage means. Each of these modules includes a particular instruction functionality. In an exemplary situation such as the coordinated-effort-requiring environment described above, the instruction functionality may comprise one of a group of simulation and/or communication modules adapted to provide representative signals and/or voice or other communications, such as within a training script or scenario.

A method of training a plurality of students to operate a coordinated assemblage of equipment comprises the steps of remotely configuring a plurality of student workstations to simulate the equipment assemblage by loading each workstation with at least one training module that includes a predetermined instruction functionality. This workstation configuration is displayed on an instructor computer.

Once the configuration is created as desired, a training scenario is run on the configured workstations under control of the instructor computer. Student input is then received from the configured workstations in response to the training scenario, and the input is monitored for appropriateness to an event within the training scenario. For example, the workstation configuration might be arrayed to simulate the command center of an aircraft carrier, and the students might be presented with a hostile aircraft approaching the aircraft carrier. The students should be able to identify the aircraft as being hostile from the signals presented to them via the workstations simulating the equipment assemblage of the carrier's command center.

Examples in the private sector might comprise a robotic assembly line in a dangerous environment, a nuclear power station, a chemical processing plant, or a telephone command center, any of which it may be desirable to monitor remotely. Students could be presented such scenarios as a malfunctioning robot, a radiation leak, a chemical spill, or a downed line.

Another method embodied in the present invention is for configuring a plurality of student workstations to simulate a coordinated assemblage of equipment. This method comprises the steps of creating a virtual space on an instructor computer display and arraying at least one representation of a selected workstation within the virtual space. The selected workstation is in network communication with the instructor computer. Typically there will be a plurality of workstations arrayed within the virtual space.

Next a training module is copied from the instructor computer to the selected workstation. This is accomplished on the instructor computer display by means known in the art, such as with a pointing device, by translating a symbol representing the training module from a first position outside the virtual space to a second position adjacent the selected workstation representation. The software interprets this translation on the display as an instruction to install the training module onto the selected workstation and also retains the symbol in the second position adjacent the workstation representation on the instructor display so that the instructor can monitor at all times a visual representation of the configuration.

The features that characterize the invention, both as to organization and method of operation, together with further objects and advantages thereof, will be better understood from the following description used in conjunction with the accompanying drawing. It is to be expressly understood that the drawing is for the purpose of illustration and description and is not intended as a definition of the limits of the invention. These and other objects attained, and advantages offered, by the present invention will become more fully apparent as the description that now follows is read in conjunction with the accompanying drawing.

DETAILED DESCRIPTION OF THE PREFERRED EMBODIMENTS

A description of the preferred embodiments of the present invention will now be presented with reference to FIGS. 1–4J.

Figure 1:
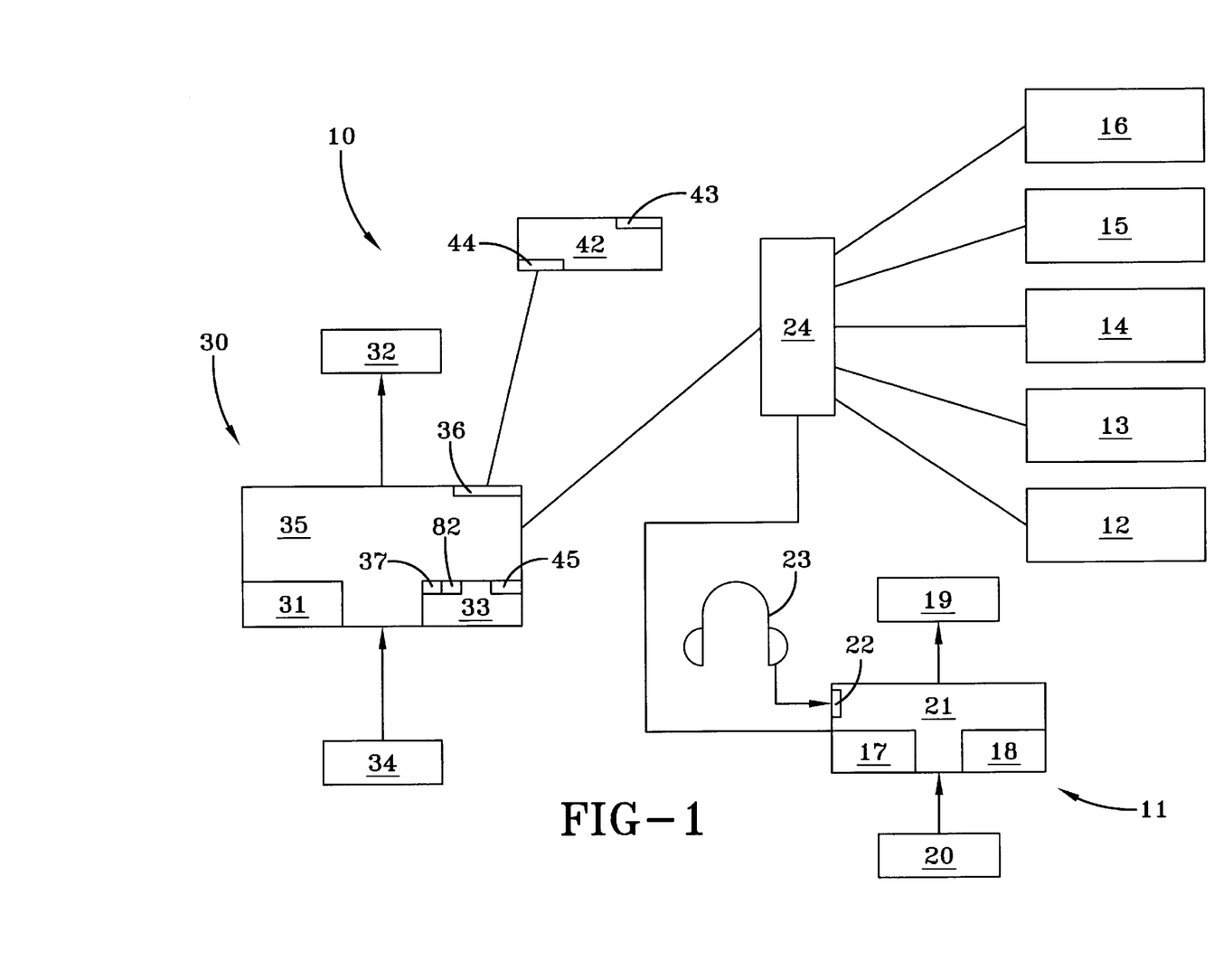
FIG. 1 is a schematic diagram of the system, including three training rooms and one instructor station networked to the training rooms.
Figures 2, 3:
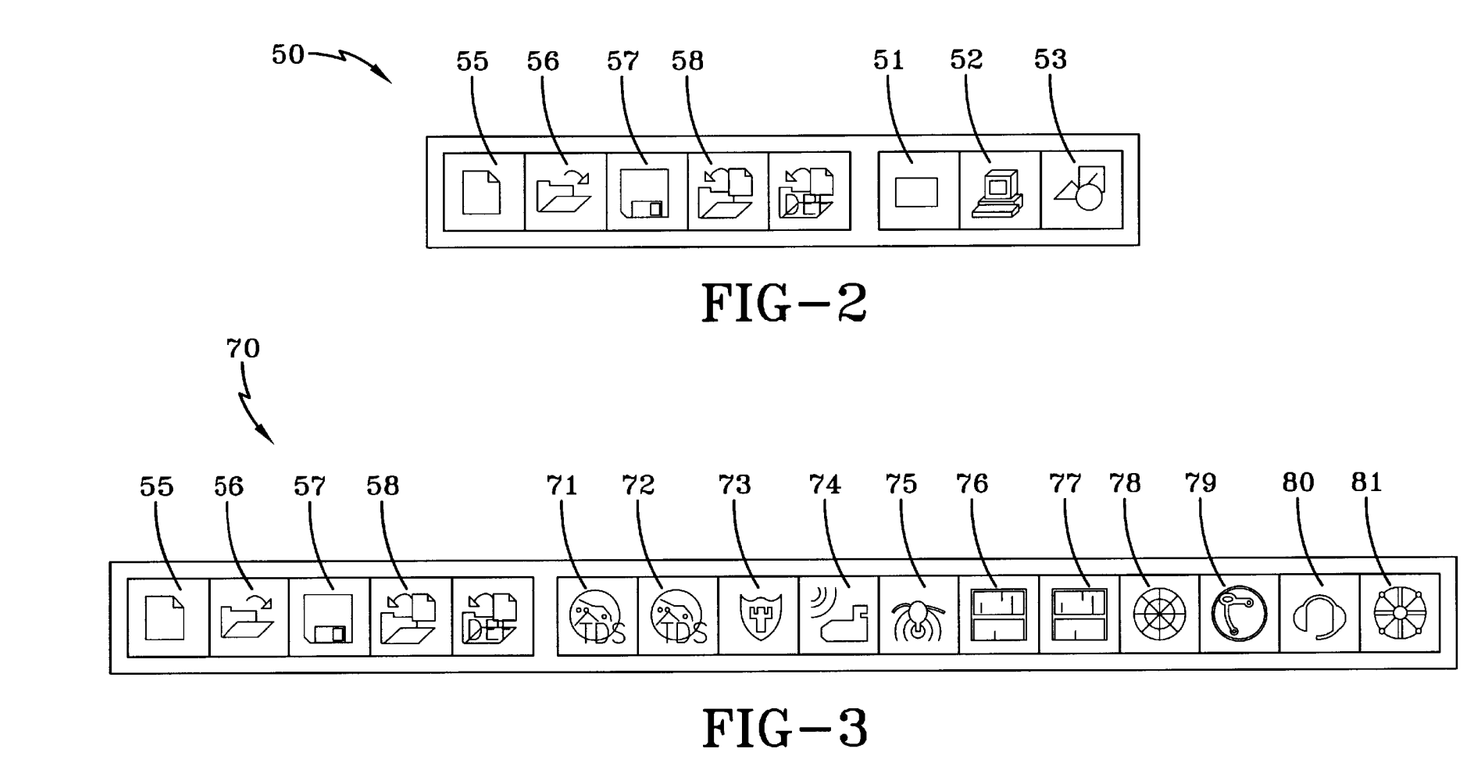
FIG. 2 is a representation of a toolbar for configuring a site.
FIG. 3 is a representation of a toolbar containing training module icons.

A system 10 for training a plurality of students comprises a plurality of workstations 11–16. An exemplary physical layout of such a system 10 is schematically illustrated in FIG. 1. Each workstation, of which workstation 11 is representative, includes a processor 17 and further includes a storage medium such as known in the art, for example, a hard drive 18, a display screen 19, and input devices such as a keyboard 20 and a pointing device ("mouse" 21, trackball, joystick, etc.), all in electronic communication with the processor 17. Some of the workstations 11–16 may also include a jack input 22 for a headset 23 for receiving sound communications.

In some embodiments a workstation 11–16 may be adapted to support multiple trainees, typically if that workstation is configured to simulate a piece of equipment that in actual use is monitored by multiple users.

The system 10 further comprises an instructor computer 30 that is in network 24 communication with each of the workstations 11–16. The instructor computer 30 may be collocated with any or all of the workstations 11–16 or may reside in a remote location. The instructor computer 30 includes a processor 31 and further includes a display screen 32, a storage medium such as a hard drive 33, and input devices such as a keyboard 34, a pointing device 35, and adaptors 36 for receiving plugin devices. All these 32–36 are in electronic communication with the processor 31.

A plurality of training modules 37 are resident on the instructor computer's hard drive 33. Each of these modules includes a predetermined instruction functionality, as will be described in the following.

In some embodiments the system 10 may also comprise a real sensor module in the network in electronic communication with the instructor computer 30. For example, a dead reckoning tracer (DRT) 42 can have an input 43 that is adapted to receive a sensed signal and an interface 44 for establishing electronic communication with the instructor computer's input adaptor 36.

Figure 4A:
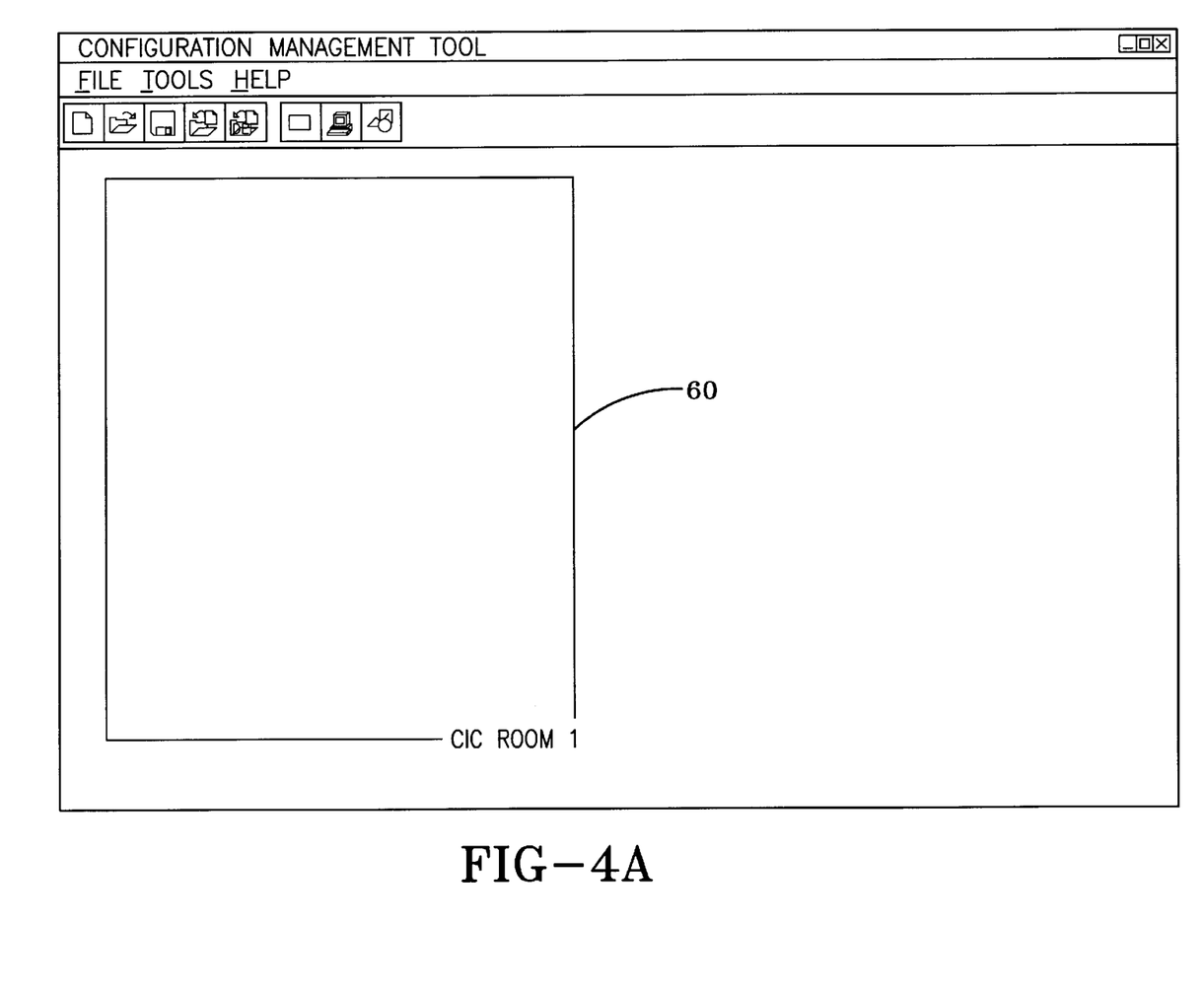
FIGS. 4A–4J are a series of screens illustrating the steps in creating a desired virtual space representation and loading workstations with training modules.
Figure 4B:
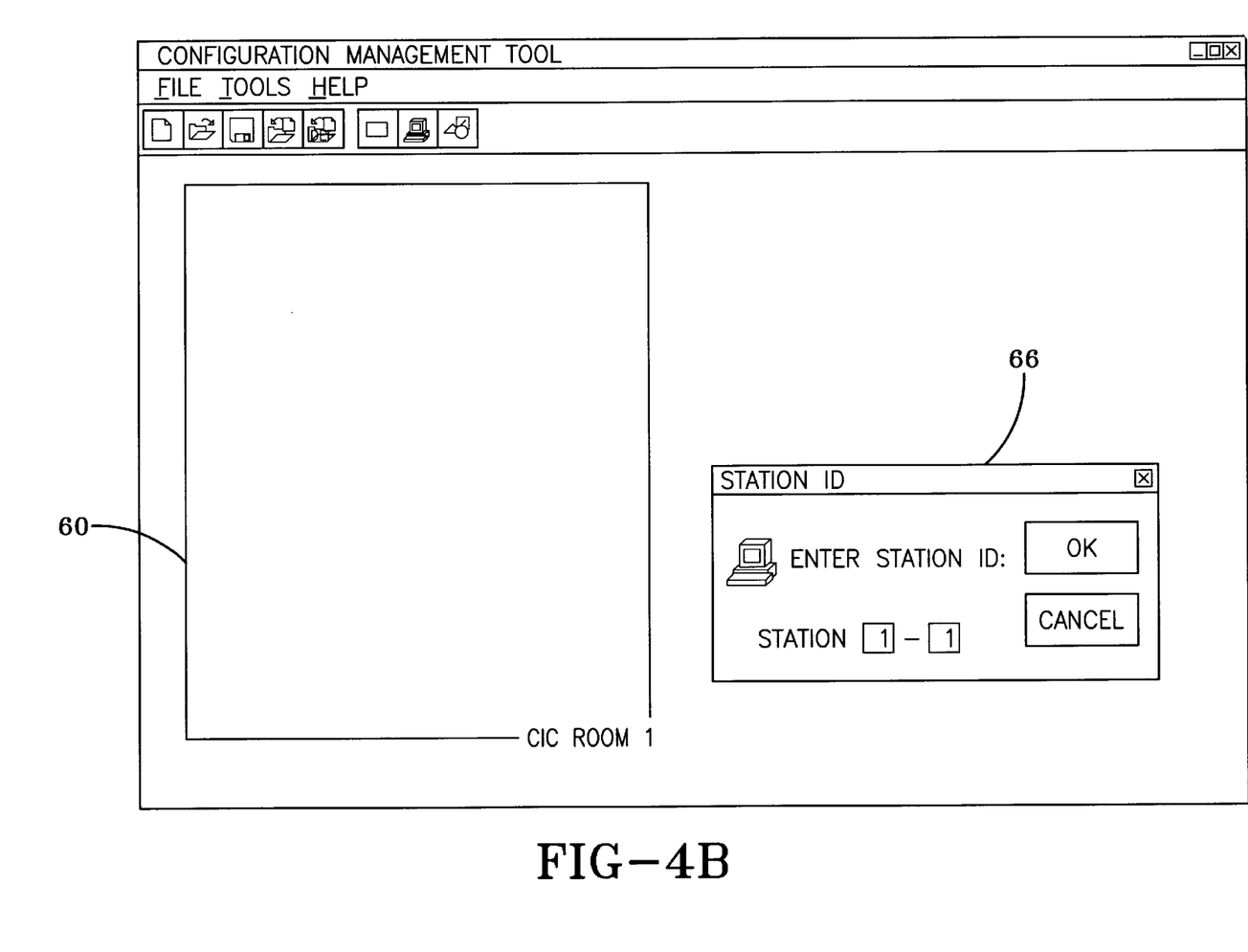
Figure 4C:
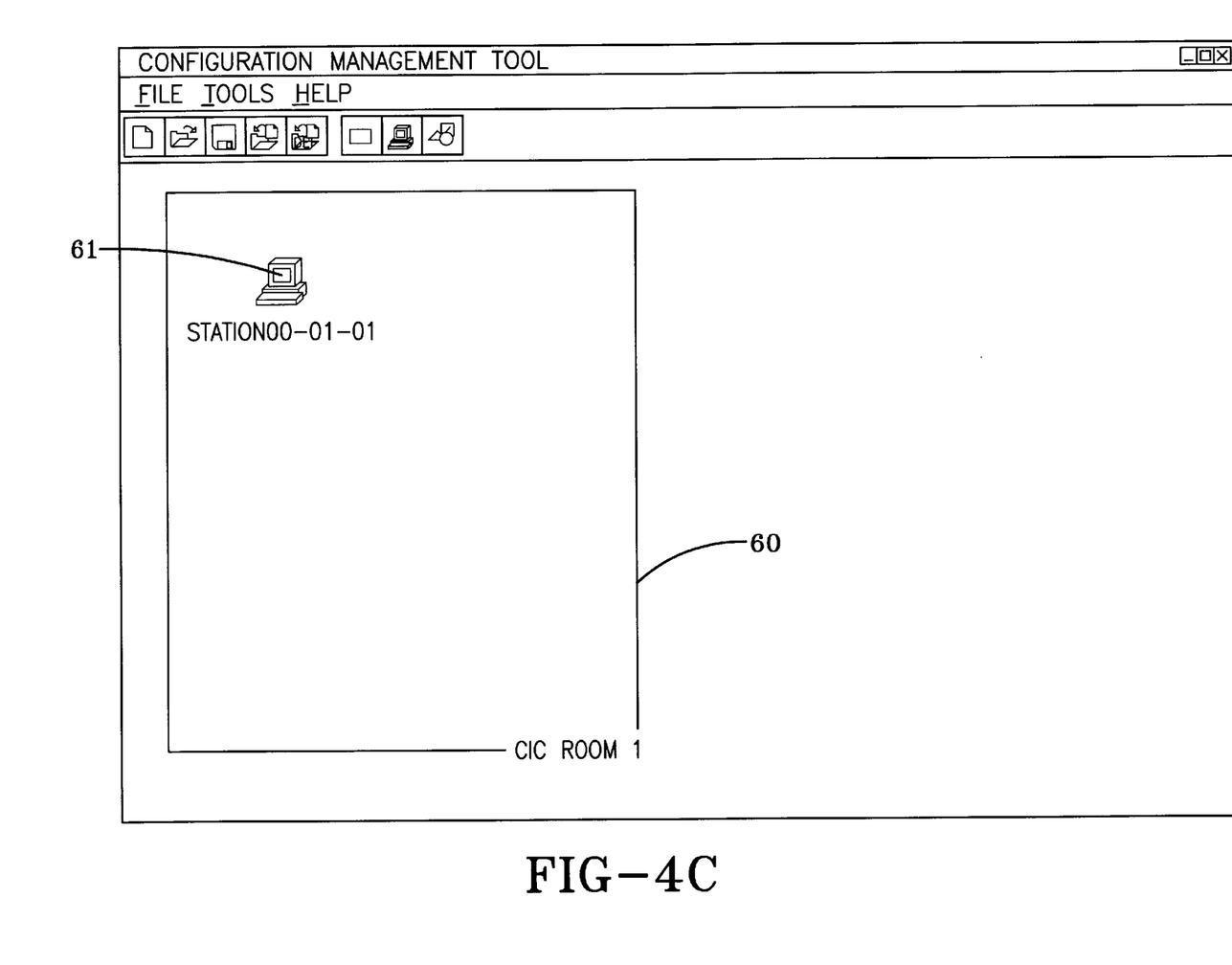
Figure 4D:
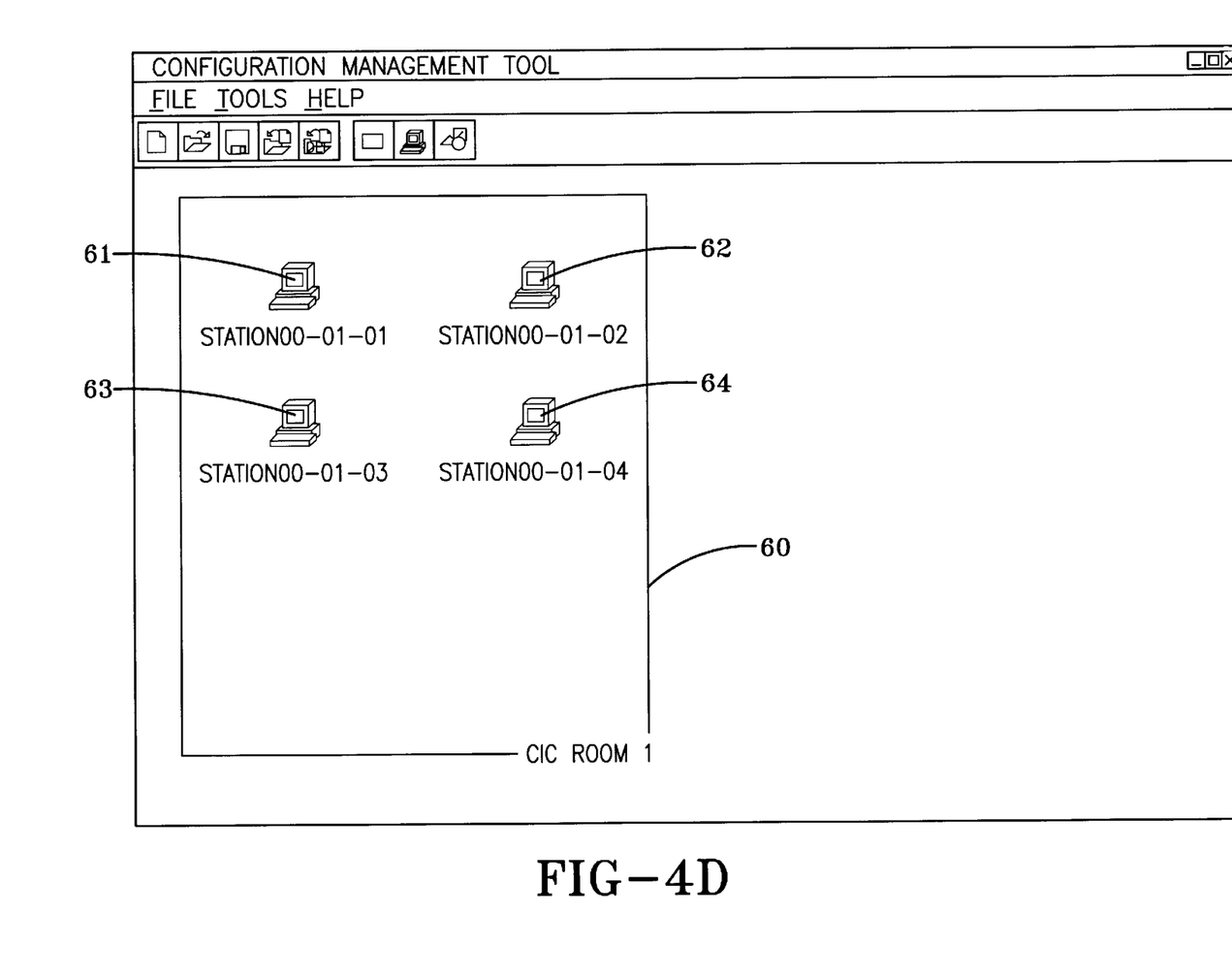

An integral part of the present invention is the configuration software 45, which is installed on the instructor computer's hard drive 33. The configuration software 45 comprises means to accomplish a plurality of tasks, including setting up a virtual space and loading workstations with a desired set of training modules. To that end, the software 45 is adapted to create and display on the instructor's screen 32 at least one virtual space containing at least some of the workstations. This may be accomplished, for example, by means known in the art such as using a mouse 35 to click on a toolbar 50 icon 51 (FIG. 2) representative of adding a virtual space 60 such as a CIC (FIG. 4A). Alternatively, dropdown menus such as are known in the art may be used. Workstations may be added to the space 60 by clicking on the toolbar 50 icon 52 (FIG. 2) representative of adding a workstation representation 61 to bring up a screen 66 requesting an identifier for the workstation 11 desired to be added (FIG. 4B). The result of this operation is shown in FIG. 4C; continuing these operations yields a space 60 with four workstation representations 61–65 (FIG. 4D).

Figure 4E:
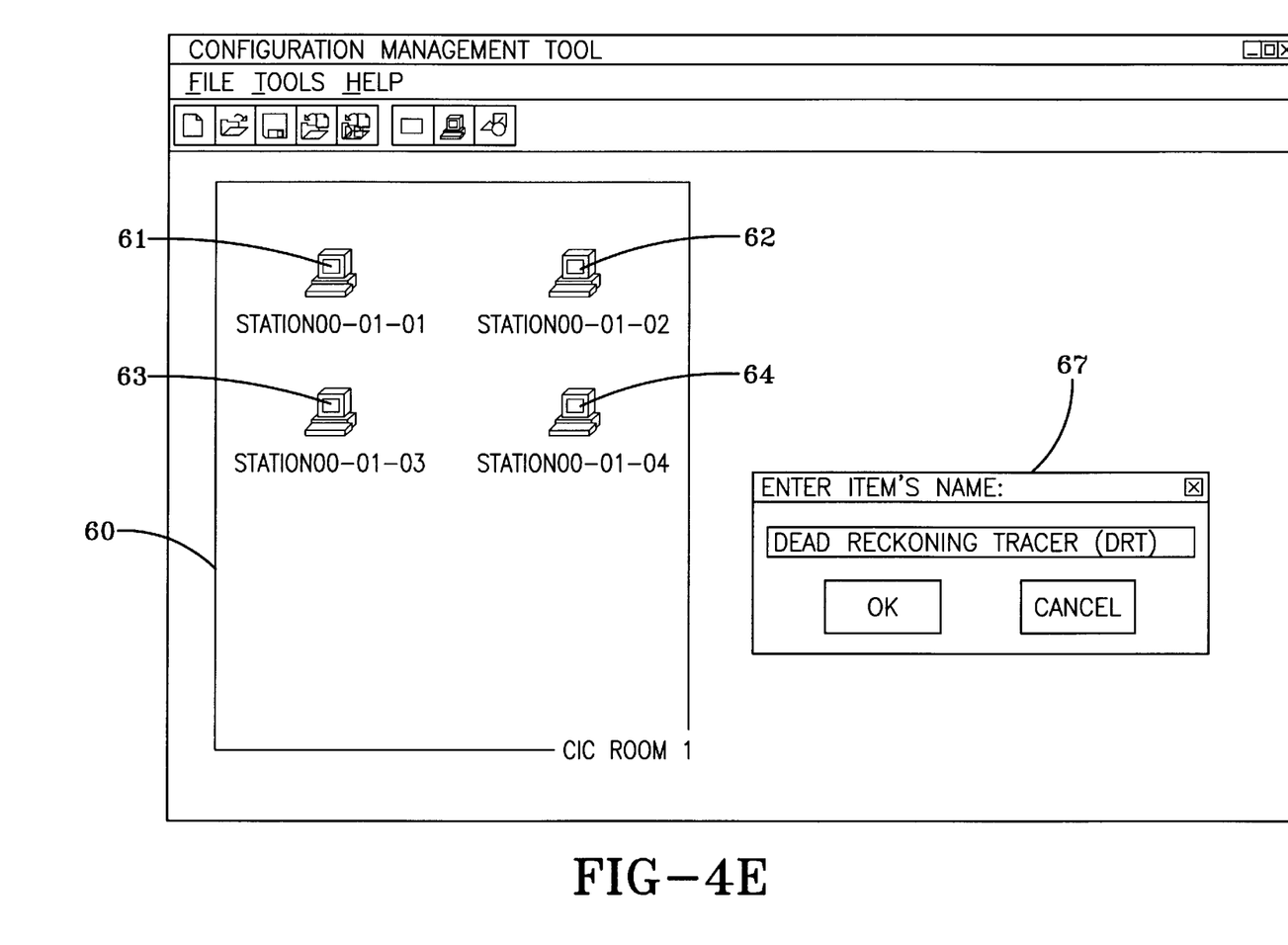
Figure 4F:
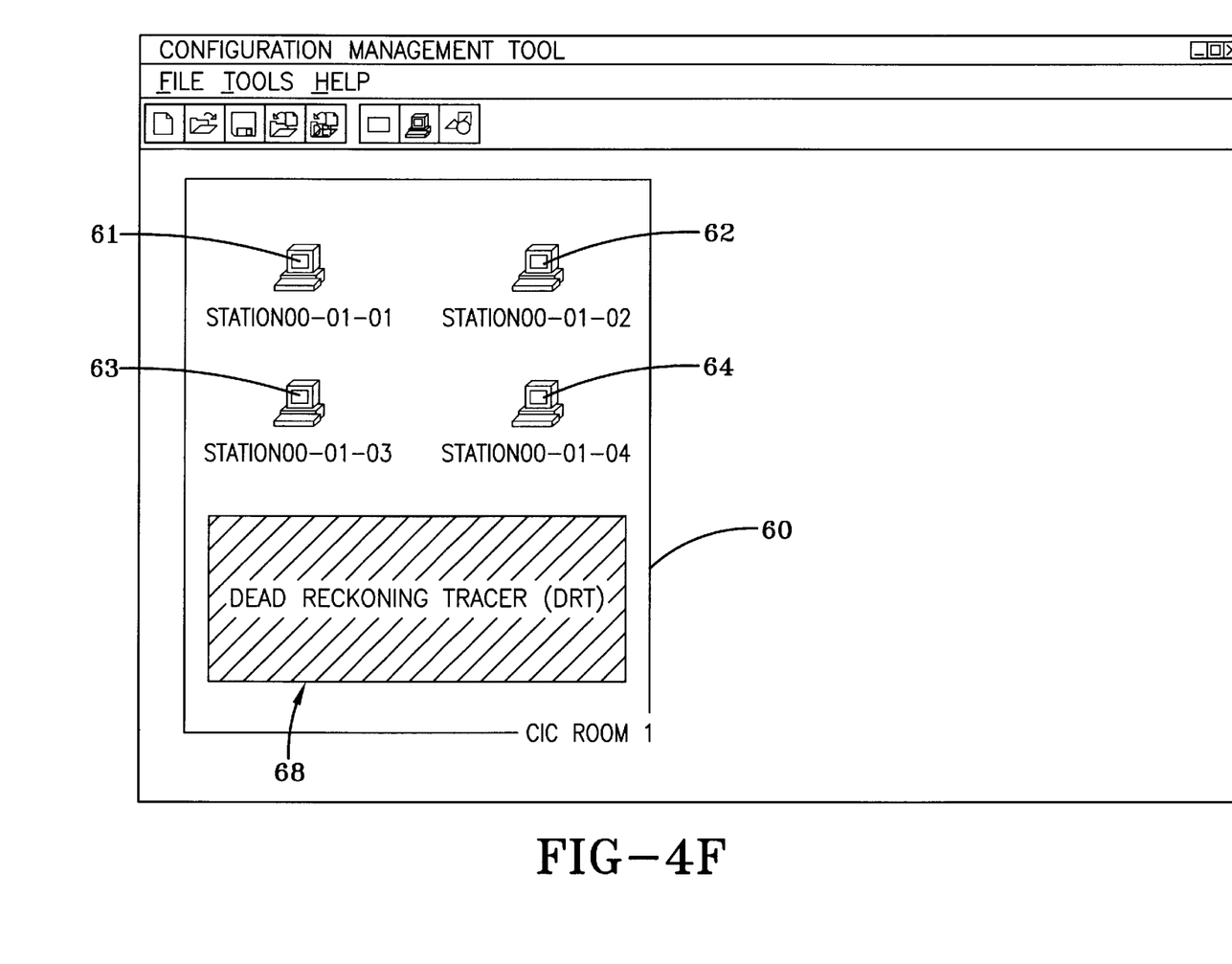

Similarly, the software 45 is adapted to display a representation of the sensor module, such as the DRT 42 referred to above. This is accomplished by clicking on a toolbar 50 icon 53 representative of adding an object to bring up a screen 67 requesting an identifier for the object, here DRT 42, desired to be added (FIG. 4E). The result of this operation is shown in FIG. 4F, wherein the space 60 has added to it a representation 68 of the DRT 42.

During or after the virtual space array creation, any or all of the object representations 61–65,68 contained therein may be moved to simulate a desired physical layout. For example, a desired physical layout may comprise that of a CIC of a particular naval vessel. In such a case, the physical layout of the workstations/objects 11–16,42 and their representations 61–65,68 can be made to correspond to the CIC for which the students are being trained, which improves the verisimilitude of the training and aids in the students' being able to transfer the knowledge gained during training from the simulation environment to the "real world."

Figure 4G:
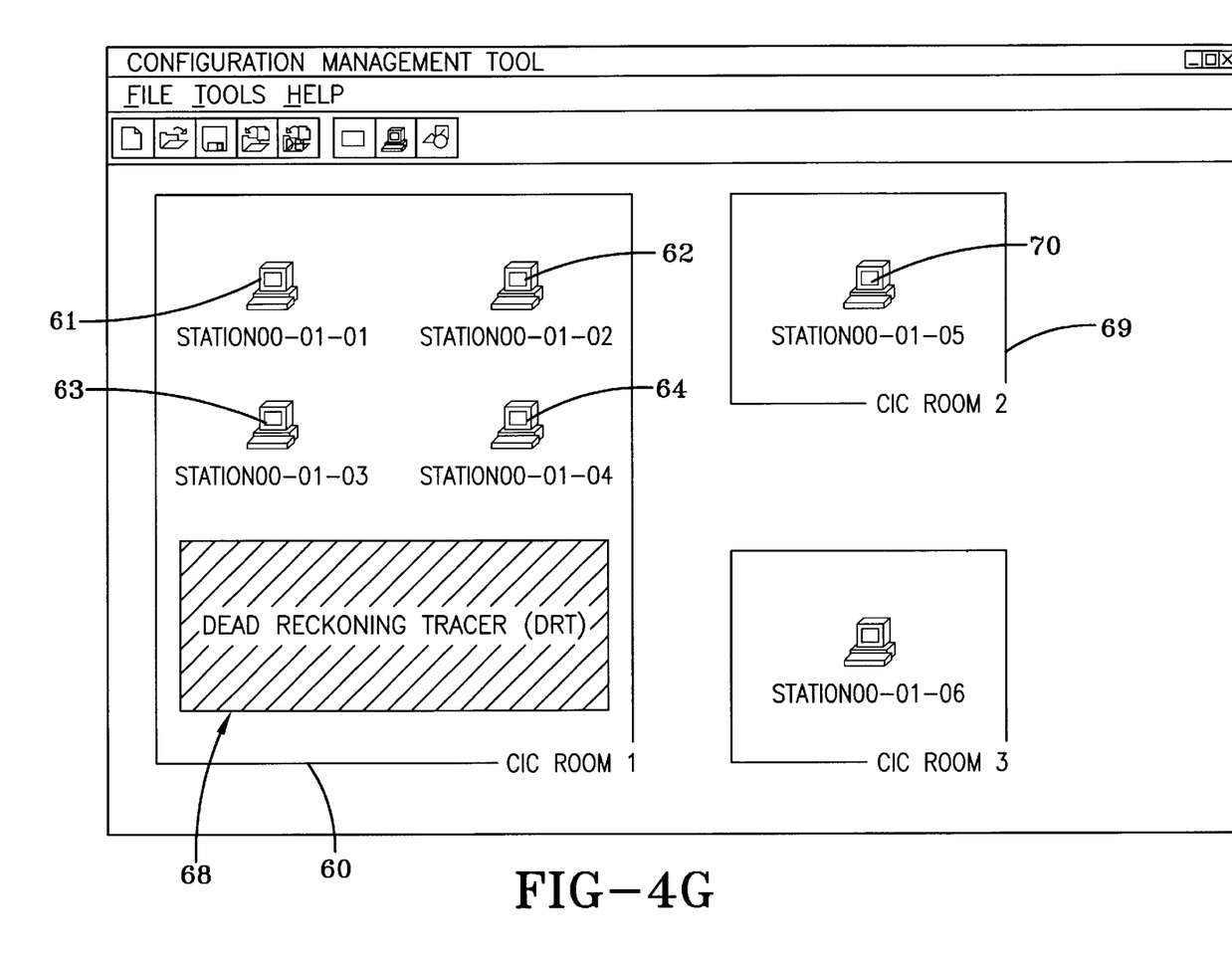
Figure 4H:
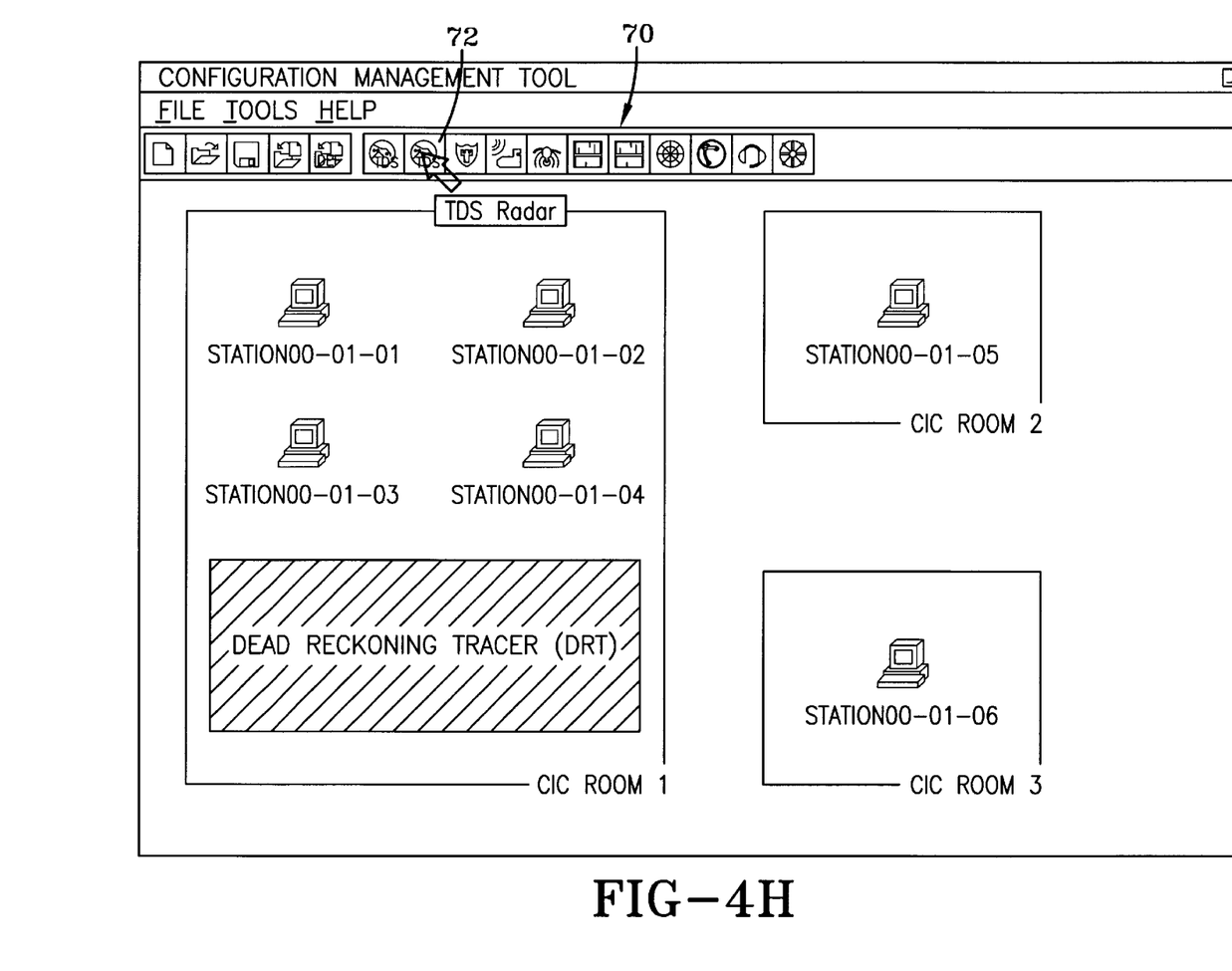
Figure 4I:
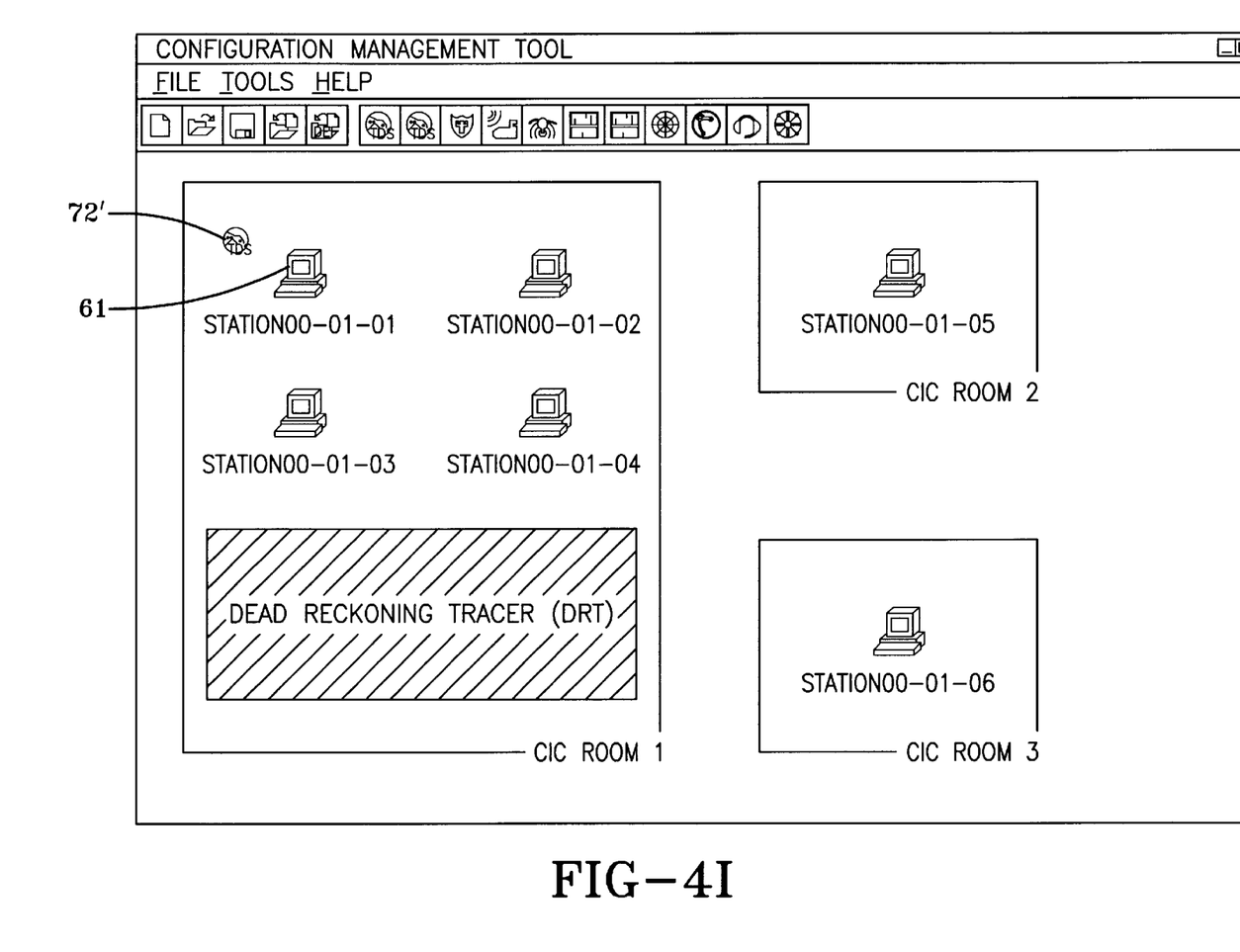

The software 45 is also adapted to permit the creating and display of additional virtual spaces 69, each containing one or more workstation representations 70, by repeating the steps outlined above (FIG. 4G). Further, the workstation representations are also adapted to indicate the status of the corresponding workstations. A filled workstation representation 61 screen, for example, indicates that the corresponding workstation 11 is active; a workstation representation 62 having a blank screen indicates an inactive workstation 12 (see FIG. 4J).

Another important aspect of the configuration software 45 includes means for receiving input via at least one of the instructor computer's input means, such as the keyboard 34 or mouse 35. Such a directive may include, for example, a configuration directive to copy an indicated training module onto a selected workstation's storage device. The software 45 is adapted to access the instructor computer's hard drive 33 to retrieve and copy the indicated training module. Finally, the software 45 is adapted to transfer the copy to the selected workstation's hard drive 18.

This selecting and copying is accomplished by clicking on the toolbar 50 icon 53 or by using a dropdown menu. This brings up another toolbar 70 (FIG. 3) that contains a plurality of icons 71–81, each representing one of the training modules available on the instructor's computer 30. In the exemplary embodiment of a CIC simulation, such modules may comprise a tactical display system (TDS) 71, TDS/radar 72, Aegis 73, sonar geographical situation (GEOSIT) 74, sonobuoy GEOSIT 75, towed array communication (TA GRAM) 76, sonobuoy GRAM 77, electronic warfare (EW) 78, antisurface warfare (ASUW) 79, communications 80, and DRT 81.

Clicking on one of the icons 72 (FIG. 4H) and then dragging the icon 72 to the representation 61 of the workstation desired to have the training module 37 added to it (FIG. 4I) directs the software 45 to access the training module 37 from the instructor computer's hard drive 33, copy the training module 37, and install the copy to the selected workstation's hard drive 18. A copy of the icon 72' remains adjacent the workstation representation 61, which provides the instructor with an indication of the training module contents of the workstation's hard drive 18.

Figure 4J:
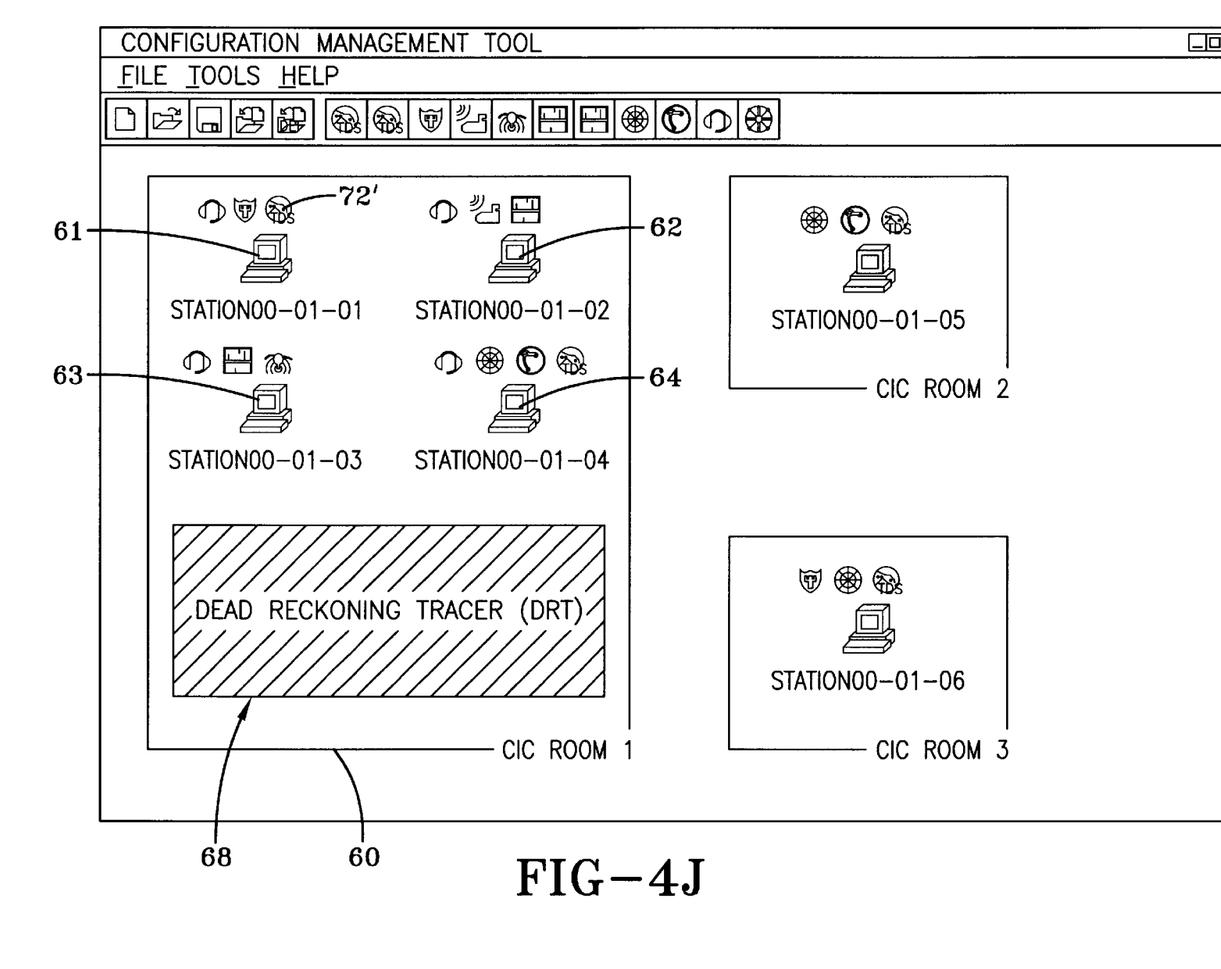

This process is continued until the desired configuration is achieved, an exemplary screen for which is illustrated in FIG. 4J. The toolbars 50,70 additionally contains icons such as are known in the art for creating a new file 55, opening an existing file 56, saving a created file 57, and saving a file as a given name 58.

The training system 10 further comprises a training scenario 82 that is resident on the instructor computer's hard drive. The configuration software 45 further comprises means for differentially playing the training scenario 82 simultaneously on each workstation 11–15 represented as being within a desired virtual space 60.

Responsive to the events/signals simulated by the training scenario 82, the students may enter input at their workstations, and the input is transmitted to the instructor's computer so that the instructor may monitor the students' actions and progress. For example, signals representative of a hostile aircraft approach within a certain range may be transmitted to the appropriate workstation(s). Other types of information transmitted to the student may include a simulated aural communication from a remote location or a real-time communication from the instructor.

It may be appreciated by one skilled in the art that additional embodiments may be contemplated, including the adaptation of the invention for other commercial or school-based training applications.

In the foregoing description, certain terms have been used for brevity, clarity, and understanding, but no unnecessary limitations are to be implied therefrom beyond the requirements of the prior art, because such words are used for description purposes herein and are intended to be broadly construed. Moreover, the embodiments of the apparatus illustrated and described herein are by way of example, and the scope of the invention is not limited to the exact details of construction.

Having now described the invention, the construction, the operation and use of preferred embodiment thereof, and the advantageous new and useful results obtained thereby, the new and useful constructions, and reasonable mechanical equivalents thereof obvious to those skilled in the art, are set forth in the appended claims.

What is claimed is:

1. A system for training a plurality of students comprising:
   a plurality of workstations, each including a processor and further including storage means, display means, and input means, all in electronic communication with the processor;
   an instructor computer in network communication with each of the workstations and including a processor and further including display means, storage means, and input means, all in electronic communication with the processor;
   a plurality of training modules resident on the instructor computer storage means, each module including a predetermined instruction functionality; and
   configuration software means resident on and under control of the instructor computer having means for:
      presenting a toolbar of icons on said instructor display means whereby said icons are selectable as means for:
         setting up at least one virtual space on said instructor display means to represent an environment such as a military command center,
         populating said at least one virtual space with a representation of each of said plurality of workstations wherein each representation is adapted to pictorially indicate whether the workstation is active,
         installing an indicated training module onto a selected workstation storage means by dragging the icon of the indicated training module toolbar to the selected workstation by accessing the instructor computer storage means to retrieve the indicated training module, copying the indicated training module; and installing the copy to the selected workstation storage means,
         identifying said module in said virtual space by providing a pictorial at said selected workstation representing said module;
      scenario means resident on the storage means of said instructor computer responsive to said configuration software for differentially playing said scenario simultaneously on each workstation represented within said at least one virtual space; and
      means at said instructor computer to monitor activity at each workstation represented within said at least one virtual space and provide instructor interaction.

* * * * *